United States Patent
Su et al.

(10) Patent No.: US 9,380,378 B2
(45) Date of Patent: Jun. 28, 2016

(54) SOUND CHANNEL FORMED IN A CASE TO REDIRECT SOUND WITH RESPECT TO A SPEAKER OF AN ELECTRONIC DEVICE POSITIONED IN THE CASE

(71) Applicant: AFC TRIDENT, INC., Ontario, CA (US)

(72) Inventors: Yi-Chieh Su, Chino, CA (US); Hong Lip Yow, Chino, CA (US)

(73) Assignee: AFC TRIDENT, INC., Ontario, CA (US)

( * ) Notice: Subject to any disclaimer, the term of this patent is extended or adjusted under 35 U.S.C. 154(b) by 644 days.

(21) Appl. No.: 13/656,584

(22) Filed: Oct. 19, 2012

(65) Prior Publication Data

US 2014/0112512 A1    Apr. 24, 2014

(51) Int. Cl.
*H04R 1/34* (2006.01)
*H04M 1/02* (2006.01)
(Continued)

(52) U.S. Cl.
CPC .............. *H04R 1/345* (2013.01); *H04M 1/026* (2013.01); *H04M 1/035* (2013.01); *H04R 1/02* (2013.01); *H04R 1/2853* (2013.01); *H04R 2499/11* (2013.01)

(58) Field of Classification Search
CPC ...... H04R 1/345; H04R 2499/11; H04R 1/02; H04R 1/2857; H04R 1/2853; H04M 1/026; H04M 1/035
USPC .......................... 381/333, 332, 386, 322, 174
See application file for complete search history.

(56) References Cited

U.S. PATENT DOCUMENTS 8,208,669 B2 * 6/2012 Hamada ................. H04N 5/642
                                                      348/836
8,971,974 B2 * 3/2015 Weaver, III .......... H04R 1/2857
                                                      379/433.02

(Continued)

FOREIGN PATENT DOCUMENTS

JP        3171000 U       10/2011
JP        3175661    *     5/2012    ............... H04R 1/34

(Continued)

OTHER PUBLICATIONS

Amazon.com, "SoundBender Easy-Fit Magnetic Sound Enhancer for iPad 2 (No Wires or Power Source)", [online], [Retrieved on Oct. 18, 2012], retrieved from the Internet at <URL: http://www.amazon.com/SoundBender-Easy-Fit-Magnetic_Enhancer-Sou . . . >, 6 pp.

(Continued)

*Primary Examiner* — Davetta W Goins
*Assistant Examiner* — Oyesola C Ojo
(74) *Attorney, Agent, or Firm* — Konrad Raynes Davda & Victor LLP; David W. Victor

(57) ABSTRACT

Provided is a case for n electronic device including a first surface, a second surface, sides between the first surface and the second surface, and a speaker on a portion of at least one of the first surface, the second surface, and the sides. The case includes a cover in which the electronic device is positioned including an inner surface facing the speaker when the electronic device is positioned in the cover. A sound channel is formed between the speaker and the inner surface when the electronic device is positioned in the cover. An opening to the sound channel to provide sound communication between the sound channel and an area in front of the first surface of the electronic device, wherein sound travels through the sound channel between the speaker and the opening.

24 Claims, 6 Drawing Sheets

(51) Int. Cl.
*H04M 1/03* (2006.01)
*H04R 1/28* (2006.01)
*H04R 1/02* (2006.01)

(56) References Cited

U.S. PATENT DOCUMENTS

| | | | |
|---|---|---|---|
| 2009/0009945 A1* | 1/2009 | Johnson | G06F 1/1613 361/679.27 |
| 2012/0027237 A1* | 2/2012 | Lin | H04R 1/02 381/340 |
| 2012/0194998 A1 | 8/2012 | McClure et al. | |

FOREIGN PATENT DOCUMENTS

| | | |
|---|---|---|
| JP | 3175661 U | 5/2012 |
| WO | 2013/128675 | 9/2013 |

OTHER PUBLICATIONS

Horsey, J., "Foco Sound Enhancer for Apple's New iPad and iPad 2 (Video)", [online], Monday Apr. 23, 2012, [Retrieved on Oct. 18, 2012], retrieved from the Internet at <URL: http://www.geeky-gadgets.com/foco-sound-enhancer-for-new-ipad-3-and . . . >, 4 pp.

McLachlan, M., "SoundJaw—iPad 1 and 2 Sound Booster (iPhone Compatible)", [online], [Retrieved on Oct. 18, 2012], retrieved from the Internet at <URL: http://www.kickstarter.com/projects/498101635/soundjaw-ipad-2-sound . . . >, 8 pp.

Simply Amazinc, LLC, "SoundBender: Power-Free Magnetic Sound Enhancer for iPad 2", [online], [Retrieved on Oct. 18, 2012], retrieved from the Internet at <URL: http://www.kickstarter.com/projects/soundbender/soundbender-power-fr . . . >, 10 pp.

Sorrel, C., "Hands-On: The SoundJaw Fixes the iPad 2's Awful Speaker", [online], Jul. 5, 2011, [Retrieved on Oct. 18, 2012], retrieved from the Internet at <URL: http://www.wired.com/gadgetslab/2011/07/hands-on-the-soundjaw-fizes-t . . . >, 2 pp.

UDS, "Foco—Sound Enhancing Device for New iPad3 and iPad2", [online], [retrieved on Oct. 18, 2012], retrieved from the Internet at <URL: http://www.kickstarter.com/projects/1689824368/foco-stick-it-and-listen>, 12 pp.

International Search Report and Written Opinion for International Application No. PCT/US2013/064711, dated Jan. 10, 2014, 11 pp.

Machine Translation for WO2013128675 (which is the Corresponding PCT Application for JP Utility Model Publication No. 3175661(U)), dated Sep. 6, 2013, 8 pp.

International Preliminary Report on Patentability (IPRP) for International Application No. PCT/US2013/064711, dated Apr. 30, 2015, 8 pp.

* cited by examiner

SOUND CHANNEL FORMED IN A CASE TO REDIRECT SOUND WITH RESPECT TO A SPEAKER OF AN ELECTRONIC DEVICE POSITIONED IN THE CASE

BACKGROUND OF THE INVENTION

1. Field of the Invention

The present invention relates to a sound channel formed in a case to redirect sound with respect to a speaker of an electronic device positioned in the case 2. Description of the Related Art Smartphone and computer tablet cases provide a protective cover to absorb shock when the device is dropped or subject to damaging forces. A case design may include an opening in the cover that exposes a speaker on the device to allow sound to project through the opening in the case.

BRIEF DESCRIPTION OF THE DRAWINGS

Embodiments are described by way of example, with reference to the accompanying drawings, which are not drawn to scale, wherein.

DETAILED DESCRIPTION

Certain electronic devices, such as tablet computes and smartphones, include a speaker on a rear surface opposite the side having the display screen. For instance, the iPad® 2 from Apple, Inc. positions the speaker on a lower area of the rear surface. (iPad is a registered trademark of Apple, Inc. in the United States and other countries). Smartphone and tablet cases often have a hard back cover to protect the device from shock. Placement of a speaker on a back surface of the tablet or smartphone poses a challenge for case manufacturers because the back cover of the case may interfere with the sound projection from the rear surface of the device.

To address these challenges, certain described embodiments provide a case having a cover in which an electronic device having a rear speaker is positioned so as to provide a sound channel between the rear speaker and an inner surface of the cover that redirects sound from the rear speaker to an opening at a front of the device. In this way, the sound is redirected from the rear speaker towards a user positioned with respect to the front surface of the electronic device. Additional described embodiments may address channeling the sound for speakers other than a rear speaker.

Reference below will be made to the drawings wherein like structures may be provided with like reference designations. In order to show the structures of various embodiments most clearly, the drawings included herein include diagrammatic representations of components of a case and an electronic device with a speaker. Thus, the actual appearance of the case and electronic device structures may appear different while still incorporating the claimed structures of the illustrated embodiments. Moreover, the drawings may show only the structures necessary to understand the illustrated embodiments. Additional structures known in the art have not been included to maintain the clarity of the drawings.

Figure 1:
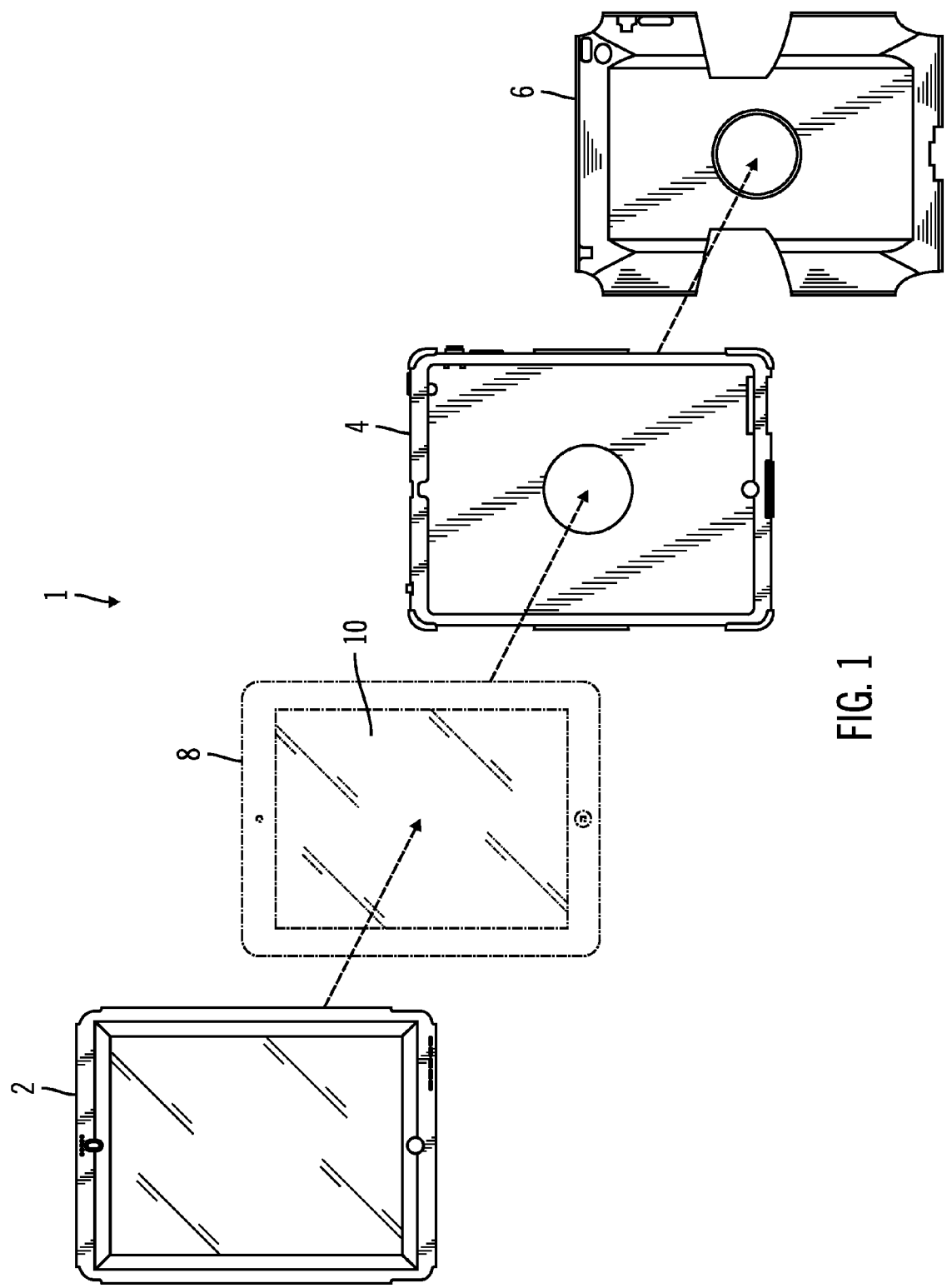
FIG. 1 illustrates a view of an embodiment of the case components and an electronic device positioned in the case components.

FIG. 1 illustrates a view of an embodiment of the case 1 components, including a front cover 2, a sleeve 4, and a back cover 6. An electronic device 8, such as a computer tablet having a display screen 10, is inserted into the sleeve 4. The sleeve 4 may be formed of a silicon material, such as a flexible material suitable for absorbing shock. The back cover 6 and front cover 2 may be formed, in whole or in part, of a hardened polycarbonate material to form a hardened shell. In alternative embodiments, other materials may be used to form the front cover 2, the sleeve 4 and the back cover 6.

Figure 2:
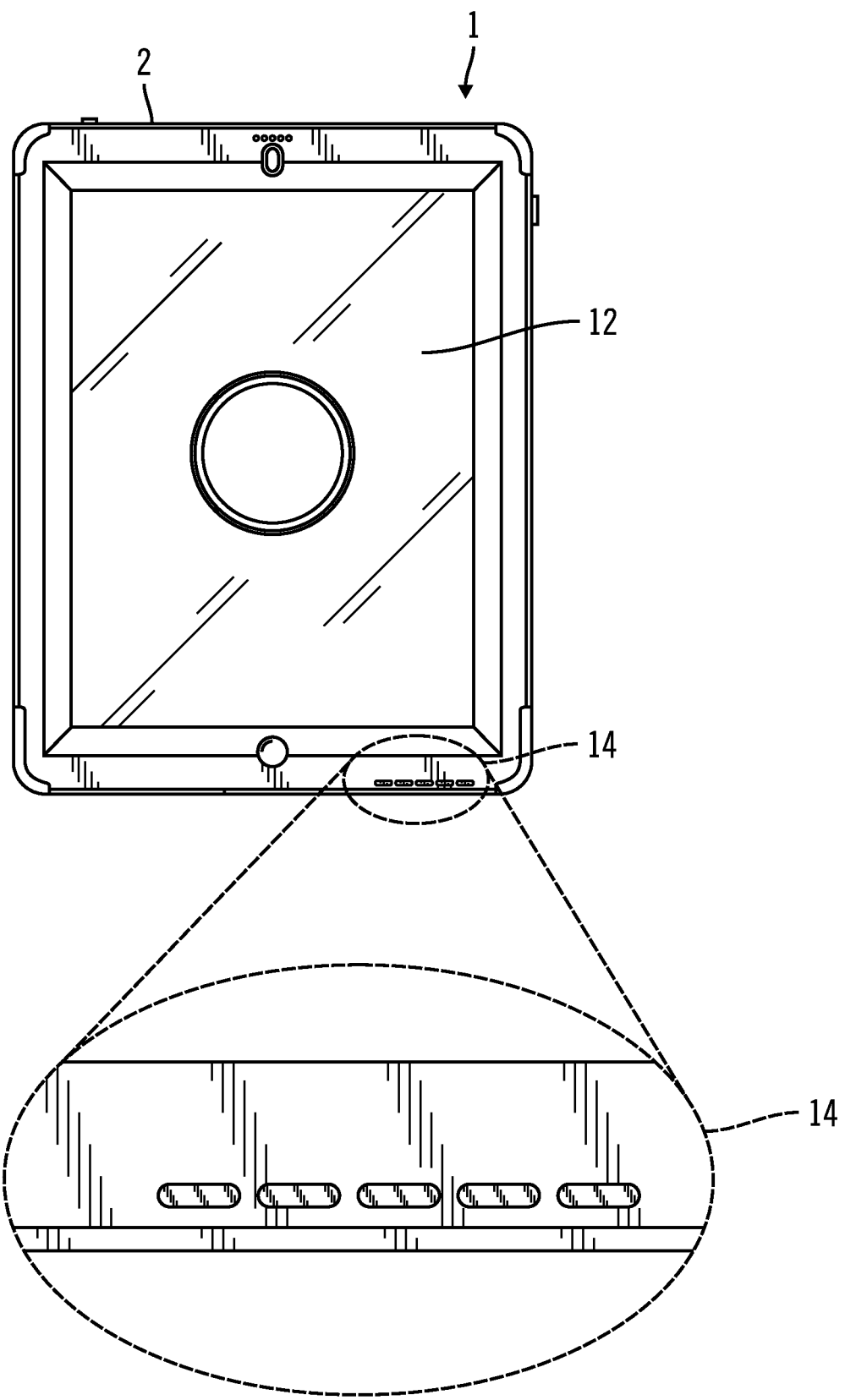
FIG. 2 illustrates a view of an embodiment of the case including a front cover.

FIG. 2 illustrates an embodiment of a view of a case 1, including the front cover 2, which includes a protective transparent shield 12 to protect the display screen 10. The front cover 2 may also have sound openings 14 through which sound may pass from a speaker on a back surface of the electronic device 8.

Figure 3:
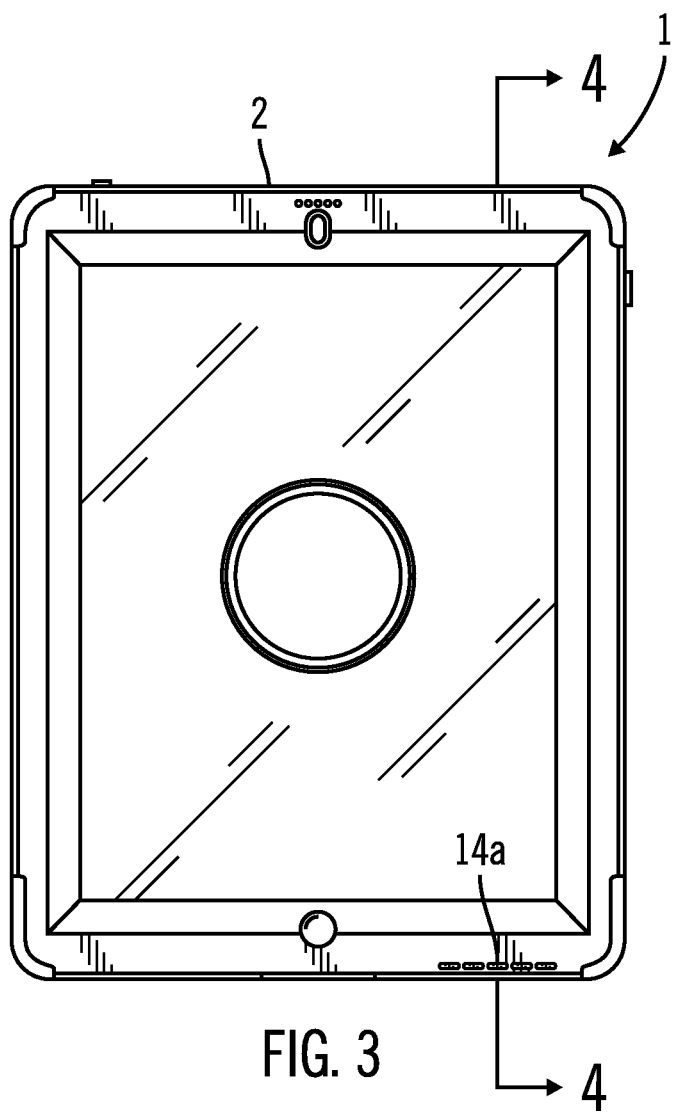
FIG. 3 illustrates a view of an embodiment of the case with a cross-section along the vertical line 4-4.

FIG. 3 illustrates a view of an embodiment of the case 1, including the front cover 2, showing a vertical cross section line 4-4 passing through one of the openings 14a in the front cover 2.

Figure 4:
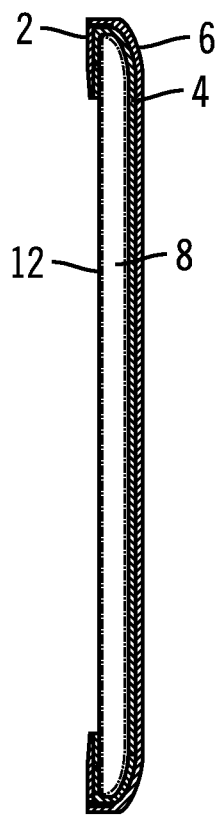
FIG. 4 illustrates a cross-sectional view of an embodiment of the case taken along the vertical line 4-4 in FIG. 3.

FIG. 4 shows the cross section taken along the vertical line 4-4 of FIG. 3 when the electronic device 8 positioned in the case 1, formed by the sleeve 4, including the electronic device 8, positioned within the front cover 2 and the back cover 6.

Figure 5:
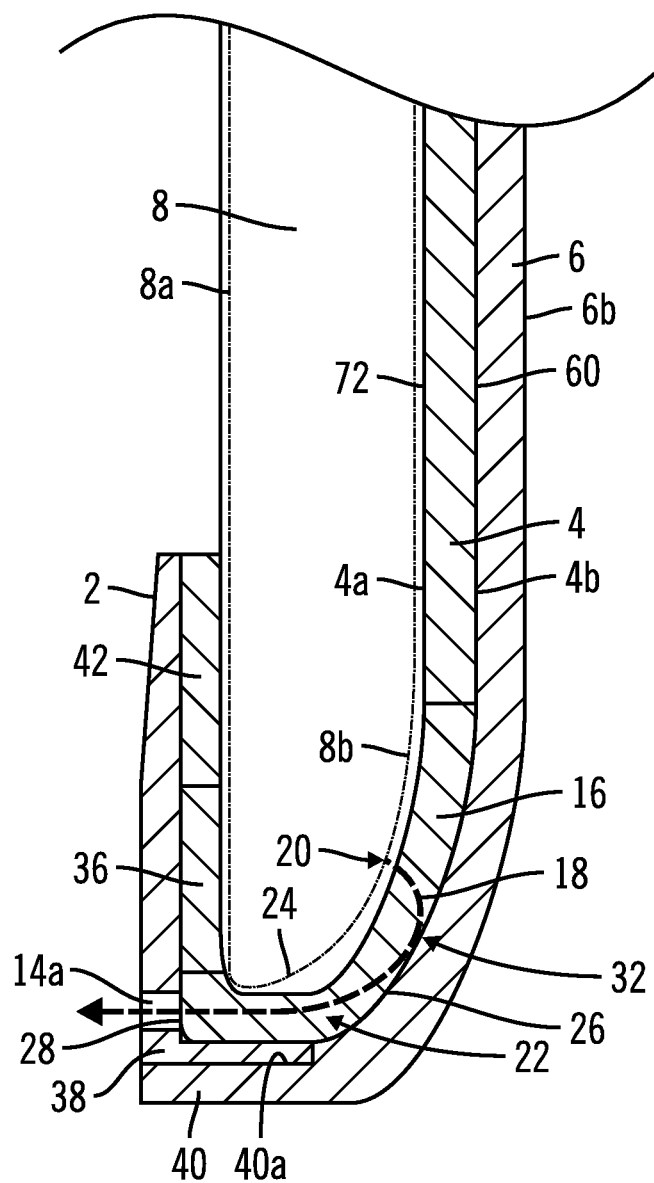
FIG. 5 illustrates an enlarged view of an embodiment of a bottom area of the cross-sectional view of FIG. 4.

FIG. 5 provides an enlarged view of an embodiment of the lower portion of the cross-sectional view shown in FIG. 4, including the front cover 2, the sleeve 4, an inner surface 4a and outer surface 4b of the sleeve 4, the back cover 6, an inner surface 6a and outer surface 6b of the back cover 6, the electronic device 8 (shown in dashed lines), and a front surface 8a and a back surface 8b of the electronic device 8.

The cross section of FIG. 5 further shows a sidewall 16 of an opening in the sleeve 4 that defines in part a sound channel 22 in sound communication with the opening 14a in the front cover 2. Sound 18, shown as the dashed arrow, is directed from a speaker location 20 on the back surface 8b of the electronic device 8, and is shown as passing through the sound channel 22, which may form an enclosed sound space, defined by the sidewall 16 of the sleeve 4, a bottom area 24 of the outer surface 8b of the electronic device 8, and an area 26 of the inner surface 6a of the back cover 6 that faces the speaker location 20. An opening 28 to the sound channel 22 also opens into the front cover opening 14a. In the embodiment of FIG. 5, the opening 28 to the sound channel 22 is shown as larger than the front cover opening 14a. In alternative embodiments, the openings 14a and 28 may have different relative sizes than shown. Sound waves 18 may travel between the speaker location 20 and the opening 28 through the sound channel 22 providing a sound space.

In an embodiment where the speaker at the speaker location 20 projects sound outward from a back surface 8b of the electronic device 8, at least some of the sound 18 waves may deflect off the inner surface 26 of the back cover 6 at a deflection area 32 and then be redirected toward the opening 28 and front cover opening 14a, so that the sound is projected outward from the opening 14a adjacent to the front surface 8a of the electronic device 8.

FIG. 5 shows the speaker location 20 projecting sound from the electronic device 8 out through the openings 14a, 28 to a user that would be positioned with respect to the front surface 8a of the electronic device 8. In an alternative embodiment, the speaker location 20 may include a microphone, so that sound may be directed from a source external to the electronic device 8 through the front cover opening 14a and opening 28, through the sound channel 22, deflecting off the deflection area 32, and toward the speaker location 20/microphone to be received.

In FIG. 5, a sleeve portion 36 may extend above the opening 28 formed in part by the sidewall 16. A front cover ledge 38 of the front cover 2 may be positioned to couple to a inner surface 40a of a back cover ledge 40 of the back cover 6 to removably attach the front cover 2 to the back cover 6. An upper front cover portion 42 of the cover 2 may fit above the sleeve portion 36 extending above the sound channel 22 and opening 28.

Figure 6:
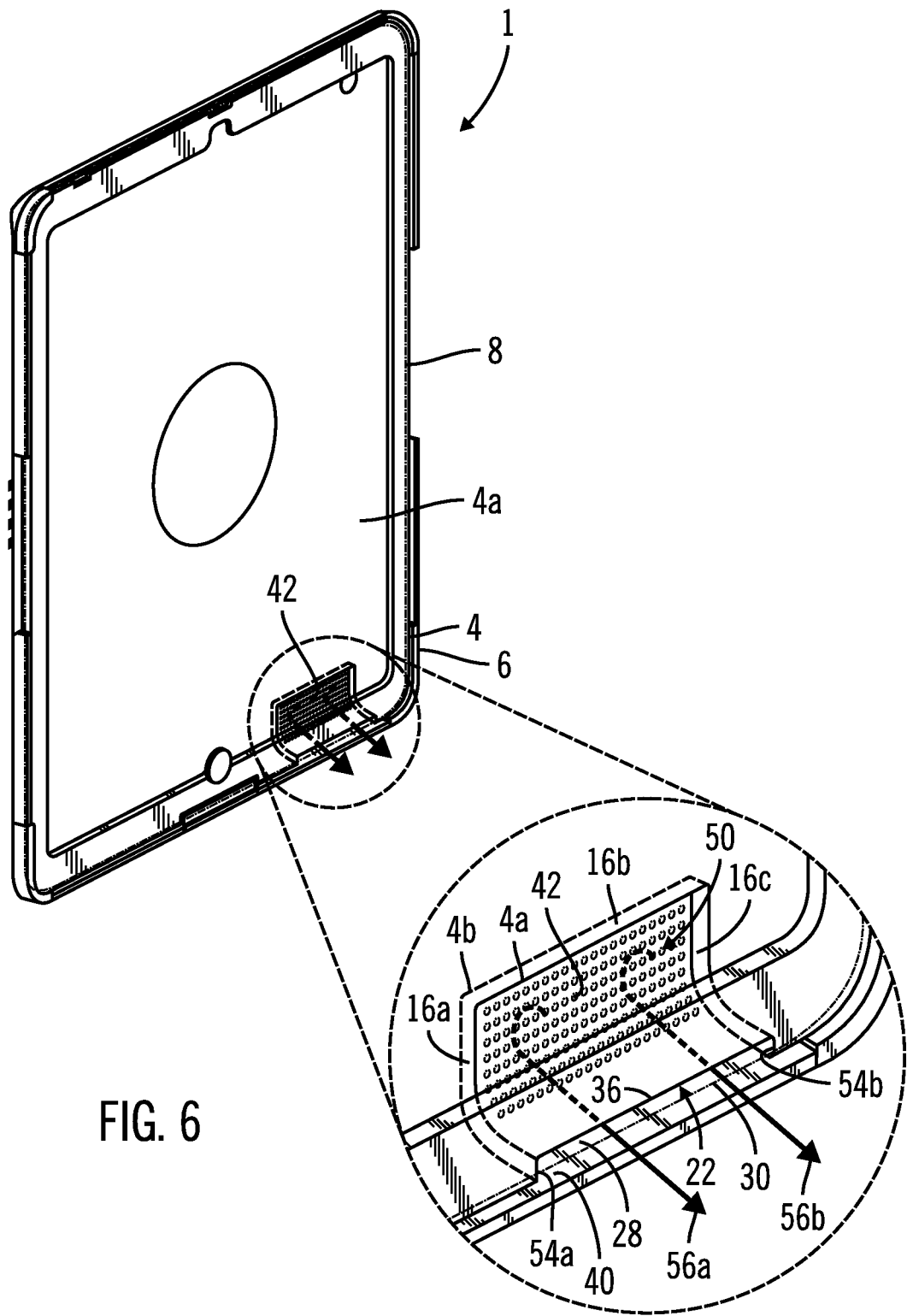
FIG. 6 illustrates a view of an embodiment of the case.

FIG. 6 illustrates a view of an embodiment of the case 1 with the electronic device 8 (shown by the dashed lines) positioned in the sleeve 4, which is positioned in the back cover 6. The view of FIG. 6 does not show the front cover 2. The view of FIG. 6 shows the inner surface 4a of the sleeve 4 that couples to the back surface 8b of the electronic device 8.

FIG. 6 shows the speaker 42 on the back surface 8b of the electronic device 8. In FIG. 6 the electronic device is shown transparent to allow the view of the speaker 4 on the back surface 8b of the electronic device 8. The expanded view of the area around the speaker 42 shows the outer surface 4b (dashed lines) and the inner surface 4a of the sleeve 4 through which an opening 50 in the sleeve is formed to surround or frame the speaker 42. Sidewalls 16a, 16b, 16c are formed in a thickness or depth of the sleeve 4 where the opening 50 in the sleeve 4 is formed. The sidewalls 16a, 16b, 16c of the sleeve 4 are positioned between the inner surface 6a of the back cover 6 and the back surface 8b of the electronic device 8.

The sound channel 22 may be defined as an enclosed space by the speaker surface 42, the sleeve sidewalls 16a, 16b, 16c, the inner surface 6a of the back cover 6, and a ledge portion 40 of the back cover 6 extending toward the front surface 8a of the electronic device 8. The opening 28 is formed by the ledge portion 40 of the back cover 6, a side 30 or edge of the electronic device 8 extending across the opening 28, the edge portions 54a, 54b of the sidewalls 16a and 16c adjacent to the front surface 8a of electronic device 8, and the sleeve portion 36 that extends across an upper part of the opening 28. Arrows 56a and 56b show some of the sound waves projected from the speaker surface 42, redirected through the sound channel 22 through the opening 28 toward a user facing the front surface 34 of the electronic device 8.

Figure 7:
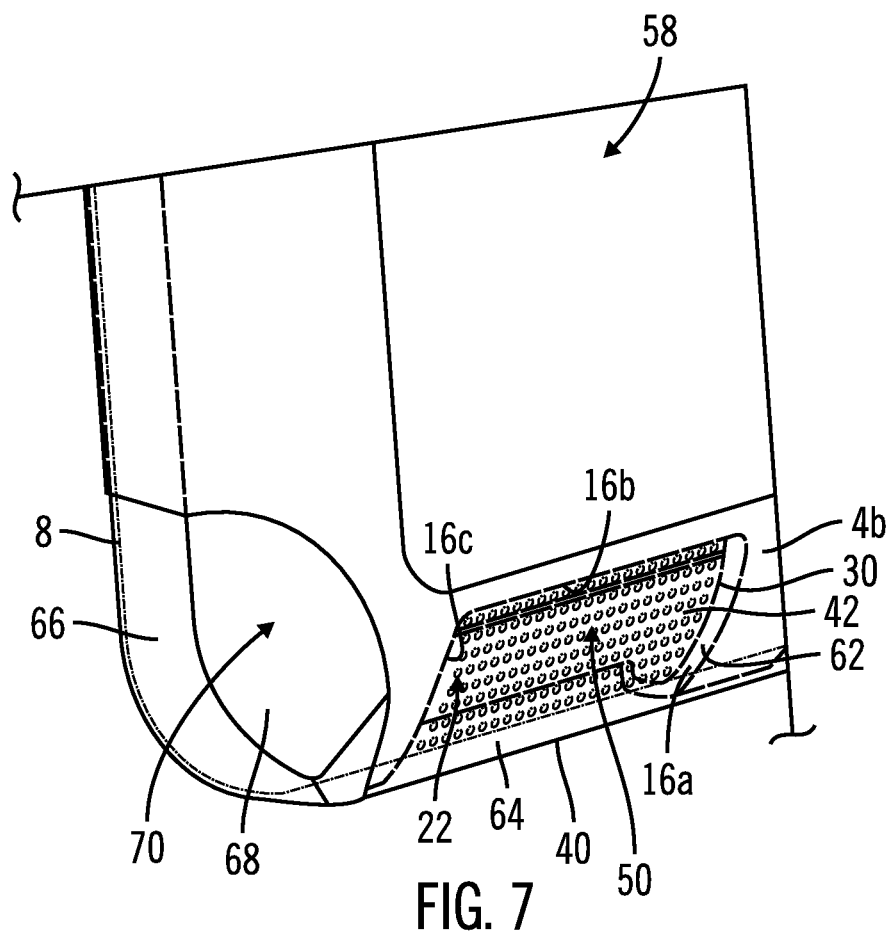
FIG. 7 illustrates a view of an embodiment of a back surface of the case.

FIG. 7 illustrates a rear view of a left corner area of the back surface 6b of the back cover 6 when the sleeve 4 and electronic device 8 are positioned in the back cover 6. An outer surface 4b of the sleeve 4 is shown in dashed lines, which would be positioned removably coupled to the inner surface 6a of the back cover 6. Sleeve sidewall 16a is shown having a length 62 or distance between the inner surface 4a and outer surface 4b of the sleeve 4 (FIG. 5), which provides a distance 62 or length between the inner surface 6a of the back cover 6 and the speaker 42. The sleeve opening 50 is formed in the sleeve 4 and is defined by the sidewalls 16a, 16b, 16c. The sound channel 22 or enclosed sound space is formed in the sleeve opening 50, and is defined by the speaker 42, the sidewalls 16a, 16b, 16c, the inner surface 6b of the back cover 6, and the inner surface 40a (also shown in FIG. 5) of back cover ledge 40.

FIG. 7 further shows left rear corners 66 and 68 of outer surface 4b of the sleeve 4 extending through an opening 70 in the back cover 6.

The above described embodiments show one speaker location and sound channel. In additional embodiments, there may be one or more additional speakers at different locations on the back surface 8b such as in different corners, on different sides, etc. A separate sound channel structure as shown above may be provided for the additional speakers at different locations on the back surface 6b of the electronic device 8. In one configuration, each speaker may have a separate sound channel structure, each sound channel having a separate opening 50 in the sleeve 6. In a further configuration, there may be multiple speakers adjacent to one another and a single sound channel may be formed to include the multiple speakers. If a single sound channel includes multiple speakers, then the opening 50 in the sleeve may surround the multiple speakers to provide the sound space through which sound from the multiple speakers is redirected.

The above described embodiments show a speaker location 20 on a lower left section of the back surface 6b. In alternative embodiments, the speaker 20 and corresponding sound channel may be positioned at different locations on the back surfaces 8a and 6b, such as in different corners, along the sides of the back surfaces 8a and 6b or between a center and a side of the back surfaces 8a and 6b.

If a speaker is located on a side of the device 8, between the front 8a and back 8b surfaces, then the sound channel may be positioned on the side of the case adjacent the side speaker to direct the sound outward from the front surface 8a or the back surface 8b of the electronic device 8. In a still further embodiment, the speaker may be located on a front surface 8a of the device 8, and the sound channel located adjacent to the speaker on the front surface 8a may redirect the sound outward from the front 8a or back 8b surfaces of the device 8. In a yet further embodiment, a speaker may extend across at least two of a front surface 8a, a back surface 8b, and a side between the front 8a and the back 8b surfaces of the device, and the sound channel would be located adjacent to the speaker extending across multiple of the front 8a, back 8b, and side surfaces. Additional orientations of the location of the speaker and positioning of the sound channel may also be realized to redirect sound in different directions outward from the device 8.

Certain described embodiments provide a case cover for use with an electronic device, such as a computer tablet or smartphone, that has a rear speaker on the back of the electronic device. The case cover forms a sound channel or enclosed sound space between the inner surface of the cover and the rear speaker to redirect sound projected from the rear speaker outward from a front surface of the electronic device toward a user positioned with respect to the front surface of the electronic device, such as in front of the front surface.

Terms such as "top", "bottom", "upper", "lower", "rear", "front", "back", "outer", "inner", "bottom", "left", "right" and the like may be used for descriptive purposes only and are not to be construed as limiting. Embodiments may be manufactured, used, and contained in a variety of positions and orientations.

In the foregoing Detailed Description, various features are grouped together for the purpose of streamlining the disclosure. This method of disclosure is not to be interpreted as reflecting an intention that the claimed embodiments of the invention require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate preferred embodiment.

While certain exemplary embodiments have been described above and shown in the accompanying drawings, it is to be understood that such embodiments are merely illustrative and not restrictive, and that embodiments are not restricted to the specific constructions and arrangements shown and described since modifications may occur to those having ordinary skill in the art.

What is claimed:

1. A case for an electronic device including a first surface, a second surface, and sides between the first surface and the second surface, and a speaker on a portion of at least one of the first surface, the second surface, and the sides, comprising: a cover in which the electronic device is positioned including an inner surface facing the speaker and the second surface of the electronic device when the electronic device is positioned in the cover; a separation structure forming a space between the speaker and the inner surface of the cover when the electronic device is positioned in the cover, wherein the electronic device is further positioned in the separation structure; and a sound channel defined by the speaker, the separation structure, and the inner surface when the electronic device is positioned in the cover, the sound channel directs sound to an area in front of the first surface of the electronic device, wherein sound travels through the sound channel between the speaker.

2. The case of claim 1, wherein the first surface comprises a front surface and the second surface comprises a back surface.

3. The case of claim 2, wherein there is at least one additional speaker positioned on the second surface of the electronic device, further comprising:
   at least one additional sound channel formed between the at least one additional speaker and the inner surface when the electronic device is positioned in the cover, wherein the at least one additional sound channel directs sound to an area in front of the first surface of the electronic device, wherein sound travels through the at least one additional sound channel from the at least one additional speaker.

4. The case of claim 1, wherein the speaker comprises a first speaker, and wherein there is a second speaker on the second surface of the electronic device, wherein the sound channel is formed between the first and the second speakers and the inner surface when the electronic device is positioned in the cover, and wherein sound travels through the sound channel from the first and second speakers.

5. The case of claim 1, wherein the speaker projects sound outward from the second surface of the electronic device, wherein at least some of the sound from the speaker is deflected off the inner surface when passing through the sound channel.

6. The case of claim 1, wherein the sound channel has an opening adjacent to the first surface of the electronic device.

7. The case of claim 1, further comprising:
   a ledge portion of the cover extending from the inner surface, wherein an opening to the sound channel is formed between one of the sides of the electronic device and the ledge portion of the cover.

8. The case of claim 1, wherein the separation structure comprises sidewalls positioned between the second surface of the electronic device and the inner surface of the case that extend around the speaker on the second surface of the electronic device when positioned in the cover, wherein the sound channel is defined by the speaker, the inner surface of the cover, and the sidewalls.

9. The case of claim 8, wherein the inner surface of the cover and the sidewalls are formed of different materials.

10. The case of claim 8, wherein an opening to the sound channel is defined by edge portions of the sidewalls.

11. The case of claim 1, wherein the cover comprises a back cover, further comprising:
    a front cover to be positioned over the first surface of the electronic device when the electronic device is positioned in the back cover; and
    at least one opening in the front cover in communication with the sound channel when the front cover is positioned over the electronic device positioned in the back cover.

12. A case for an electronic device including a front surface, a back surface, sides between the front surface and the back surface, and a speaker on a portion of the back surface, comprising:
    a sleeve in which the electronic device is positioned;
    a sleeve opening in the sleeve facing the speaker when the electronic device is positioned in the sleeve, wherein the sleeve opening is defined by sidewalls in the sleeve that extend around the speaker;
    a cover in which the sleeve including the electronic device is positioned, wherein the cover includes an inner surface facing the sleeve opening and the speaker when the electronic device and the sleeve are positioned in the cover; and
    a sound channel formed in the sleeve opening, and defined by the speaker, the inner surface of the cover, and the sidewalls of the sleeve when the electronic device and the sleeve are positioned in the cover, wherein the sound channel directs sound from the speaker outward from the case.

13. The case of claim 12, wherein the sound channel has an opening adjacent to the front surface of the electronic device.

14. The case of claim 13, further comprising:
    a deflection area on the inner surface of the cover, wherein the speaker projects sound outward from the back surface of the electronic device and wherein at least some of the sound deflects off the deflection area toward the opening to the sound channel.

15. The case of claim 12, wherein the inner surface of the cover and the back surface of the electronic device are separated by a distance defined by a length of the sidewalls between an inner surface and outer surface of the sleeve when the electronic device and the sleeve are positioned in the cover.

16. The case of claim 12, wherein when the electronic device is positioned in the sleeve, the sleeve extends from the back surface of the electronic device and a portion of the front surface of the electronic device, wherein the sleeve opening extends from the back surface of the electronic device toward the portion over the front surface of the electronic device.

17. The case of claim 12, wherein an opening to the sound channel is formed in the sleeve opening adjacent to one of the sides of the electronic device.

18. The case of claim 12, further comprising:
    a ledge of the cover extending along an opening to the sound channel adjacent to one of the sides of the electronic device; and
    edge portions of the sidewalls, wherein the opening to the sound channel is defined by the edge portions of the sidewalls, one of the sides of the electronic device and the ledge of the cover.

19. The case of claim 12, wherein the cover comprises a back cover, further comprising:
    a front cover positioned over the front surface of the electronic device when the electronic device is positioned in the sleeve and the back cover; and a plurality of openings in the front cover in communication with the sound channel when the electronic device is positioned in the sleeve, the back cover and the front cover.

20. The case of claim 12, wherein the sleeve is formed of a silicon material and the inner surface of the cover is formed of a hardened polycarbonate.

21. The case of claim 12, wherein the electronic device comprises a tablet computer or a smartphone.

22. A case for a tablet computer including a front surface having a display screen, a back surface, sides between the front surface and the back surface, a speaker on a portion of the back surface adjacent to one of the sides, wherein the speaker projects sound outward from the back surface of the tablet computer, and a display screen on the front surface, comprising:
 a sleeve in which the tablet computer is positioned, wherein the sleeve extends across the back surface of the tablet computer;
 a sleeve opening in the sleeve facing the speaker, wherein the sleeve opening is defined by sidewalls in the sleeve that extend around the speaker;
 a cover in which the sleeve including the tablet computer is positioned, wherein the cover includes an inner surface facing the sleeve opening and the speaker when the tablet computer in the sleeve is positioned in the cover; and
 a sound channel formed by the speaker, the inner surface of the cover, and the sidewalls when the sleeve including the tablet computer is positioned in the cover, wherein the sound channel directs sound outward from the case.

23. The case of claim 22, wherein the cover comprises a back cover, further comprising:
 a front cover positioned over the front surface of the tablet computer when the tablet computer is positioned in the sleeve and the cover;
 a transparent sheet within the front cover facing the display screen; and
 a plurality of openings in the front cover between the transparent sheet and an edge of the front cover that are positioned over the opening to the sound channel when the sleeve including the tablet computer are positioned in the back cover and the front cover.

24. A case for an electronic device including a first surface, a second surface, and sides between the first surface and the second surface, and a speaker on a portion of at least one of the first surface, the second surface, and the sides, comprising:
 a sleeve in which the electronic device is positioned;
 a back cover in which the electronic device and sleeve are positioned including an inner surface facing the speaker when the electronic device is positioned in the back cover;
 a front cover coupled to the back cover opposite the inner surface;
 a ledge extending outward from the inner surface of the back cover toward the front cover, wherein one of the sides of the electronic device is positioned adjacent to the ledge when the electronic device is positioned in the back cover;
 a sound channel formed between the speaker when the electronic device is positioned in the back cover and the inner surface and extending from the inner surface across the ledge; and
 an opening defined in the front cover in communication with the sound channel adjacent to the ledge to provide sound communication from the sound channel through the opening in the front cover to an area in front of the first surface of the electronic device, wherein sound travels through the sound channel between the speaker and the opening in the front cover.

* * * * *